(12) United States Patent
Isbill

(10) Patent No.: US 11,936,167 B2
(45) Date of Patent: Mar. 19, 2024

(54) PREFABRICATED ELECTRICAL CIRCUIT BREAKER PANEL COVER EXTENSION USED IN A FLUSH MOUNT APPLICATION

(71) Applicant: Bryan Joseph Isbill, Bethlehem, GA (US)

(72) Inventor: Bryan Joseph Isbill, Bethlehem, GA (US)

( * ) Notice: Subject to any disclaimer, the term of this patent is extended or adjusted under 35 U.S.C. 154(b) by 619 days.

(21) Appl. No.: 17/177,113

(22) Filed: Feb. 16, 2021

(65) Prior Publication Data

US 2021/0175690 A1  Jun. 10, 2021

Related U.S. Application Data

(60) Provisional application No. 63/141,457, filed on Jan. 25, 2021.

(51) Int. Cl.
*H02B 1/44* (2006.01)
*H02B 1/052* (2006.01)
*H02B 1/056* (2006.01)

(52) U.S. Cl.
CPC .............. *H02B 1/44* (2013.01); *H02B 1/052* (2013.01); *H02B 1/056* (2013.01)

(58) Field of Classification Search
CPC .......... H02B 1/44; H02B 1/052; H02B 1/056; H02B 1/40; H02B 1/42; H02B 1/46; H02B 1/48; H02B 1/044; H02G 3/08; H02G 3/081; H02G 3/14; H02G 3/10; H02G 3/12; H05K 5/03; H05K 5/0217

(Continued)

(56) References Cited

U.S. PATENT DOCUMENTS

D261,135 S    10/1981  Horne
4,297,525 A  * 10/1981  Bowden, Jr. ........... H02G 3/123
                                                    220/3.6

(Continued)

FOREIGN PATENT DOCUMENTS

EP    3276108 A1   1/2018
FR    2546560 A1   5/1983
JP    H0711516 Y2  9/1989

OTHER PUBLICATIONS

"Loadcenters and Circuit Breakers", www.eaton.com, vol. 1—Residential and Light Commercial, First aware of in Jun. 2022 (dated "Apr. 2019" but no knowledge or admission of that being correct), p. 1.

*Primary Examiner* — Angel R Estrada
(74) *Attorney, Agent, or Firm* — Perilla Knox & Hildebrandt LLP

(57) ABSTRACT

A breaker panel cover extension can be installed above or below a breaker panel and can hide imperfections or openings in drywall immediately above or below the breaker panel. The cover extension can include a panel member having a top edge, a bottom edge, a left edge, and a right edge defining an area of the panel member. The panel member having a front face and a rear face. A thin and narrow bottom flange extends downwards from the bottom edge and away from the panel member. The thin and narrow flange can extend along the length of the bottom edge. On the rear face of the panel member, below the top edge, two or more brackets can be coupled to the rear face of the panel member. Each bracket can have a coupling member configured to engage the cover extension to the drywall.

18 Claims, 7 Drawing Sheets

(58) Field of Classification Search
USPC .. 174/50, 481, 53, 57, 66, 67, 542, 535, 58;
220/3.2, 3.3, 3.8, 241, 242
See application file for complete search history.

(56) References Cited

U.S. PATENT DOCUMENTS

| | | | | |
|---|---|---|---|---|
| 4,979,633 | A | 12/1990 | Lakey | |
| 6,194,657 | B1 * | 2/2001 | Gretz | H02G 3/123 174/53 |
| 6,241,368 | B1 * | 6/2001 | Depino | F21V 21/04 362/147 |
| 6,683,247 | B1 * | 1/2004 | McTavish | H02G 3/14 174/45 R |
| 6,686,540 | B2 | 2/2004 | Compagnone, Jr. | |
| 7,300,025 | B2 * | 11/2007 | Korcz | H02G 3/123 220/3.9 |
| 7,468,487 | B1 * | 12/2008 | Murphy | H02G 3/14 220/3.6 |
| 7,759,576 | B1 * | 7/2010 | Gretz | H02G 3/123 439/535 |
| 8,445,779 | B1 * | 5/2013 | Gretz | H02G 3/123 174/53 |
| 8,720,156 | B2 * | 5/2014 | Porter | F16B 21/09 52/127.9 |
| 9,453,616 | B2 | 9/2016 | Myers et al. | |
| 9,611,879 | B2 * | 4/2017 | DeCosta | F16B 13/0833 |

\* cited by examiner

PREFABRICATED ELECTRICAL CIRCUIT BREAKER PANEL COVER EXTENSION USED IN A FLUSH MOUNT APPLICATION

FIELD OF INVENTION

The present invention relates to a cover for a wall, and more particularly, the present invention relates to a prefabricated electrical circuit breaker panel cover extension for hiding imperfections or openings in a section of a wall.

BACKGROUND

An electrical circuit breaker panel, also known as a distribution board, is the main distribution point for electrical circuits in a home. A typical breaker panel in a united states' home includes a cabinet or enclosure that is mounted inside a 16 inch on center, 2×4 stud wall. The cabinet is usually made of sheet metal. The cabinet which includes the wiring and electrical devices is covered by a panel cover. The panel cover is installed flush with the drywall or other wall coverings, hiding the cabinet and its immediate surrounding. The panel cover may also include a door for gaining access into the cabinet.

Later, after installation, it is common to have modifications in the wiring of the breaker panel. The modification can be adding new wires or replacing the old ones. Wires are usually added into the panel from above or below, into the wall and travel to different electrical points in a building. Adding or removing a wire in a breaker panel is difficult, time consuming, and generally requires cutting off a section of the drywall above or below the breaker panel. First, the panel cover is removed and then a section of the drywall is cut-off for gaining access to the wires. After completion of the job, the section of the drywall can be repaired.

However, the repairing of the drywall is both a laborious and time-consuming job. Moreover, the pathing of the drywall is not always perfect and can look odd and imperfections may be there. Since later modifications in wiring after installations are common and may be frequent, a long-standing need is there for a cover that can hide the cutouts, patches, or imperfections in drywall immediately above or below a breaker panel.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a breaker panel cover extension that can hide imperfections or openings in drywall immediately above or below the breaker panel.

It is an additional object of the present invention that the cover extension is prefabricated and quick to install.

It is a further object of the present invention that the cover extension can have an aesthetic appearance.

It is another object of the present invention that the cover extension can be easily installed and removed.

It is yet another object of the present invention that the cover extension is economical to manufacture and install.

In one aspect, disclosed is a breaker panel cover extension that can be installed above or below a breaker panel and can hide imperfections or openings in drywall immediately above or below the breaker panel. The disclosed cover extension can include a panel member having a proximal end and a distal end. The panel member can have a top edge, a bottom edge, a left edge, and a right edge defining an area of the panel member. The panel member having a front face and a rear face. A thin and narrow downward flange extends downwards from the bottom edge and away from the panel member. The thin and narrow flange can extend along the length of the bottom edge. In one case, the thin and narrow flange is slightly offset rearwardly which can tuck behind the panel cover of the breaker panel. In one case, the thin and narrow flange is continuous with the rear face of the panel member. The distal end of the panel member, near the top edge, can have two or more brackets wings or zip-mount retainers integrated on its rear face. The bracket wings hold the cover extension tight to the wall.

In one aspect, the panel member can have a curved flange that extends along the periphery of the panel member and curves rearwardly. The thin and narrow bottom flange extends downwards from the lower end periphery of the curved flange. The brim of the curved flange and the rear face of the bottom flange can be coplanar.

In one aspect, the bracket can be an L-shaped bracket having two protruding legs i.e., an upper leg and a side leg, on the rear face of the panel member. At the intersection of the two legs of the bracket, between the two legs, can be a hole in the panel member. A flip tab can be coupled to the panel member through a fastener that runs through the hole in the panel member. The head of the fastener is on the front face of the panel member while the shank of the fastener freely passes through the hole. The shank having threads along its length. The flip tab can be of a narrow and elongated geometry its one end configured as a screw, wherein the inner surface of the screw is having threads configured to threadedly engage with the threads of the shank. Clockwise rotation of the fastener can turn the flip tab clockwise, while the upper leg of the bracket restricts the clockwise rotation of the flip tab, wherein the upper leg points towards the upper edge of the panel member. The anticlockwise rotation of the fastener can rotate the flip tab anticlockwise while the side leg of the bracket limits the anticlockwise rotation of the flip tab. Thus, the flip tab can rotate 90 degrees between the two legs of the bracket.

These and other objects and advantages of the embodiments herein will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a breaker panel cover extension that can be installed above or below a breaker panel. The cover extension can be used to hide cut-outs imperfections in drywall immediately above or below the breaker panel. Such cut-outs in the drywall can be made to add wires into the panel. Additionally, during the replacement of a circuit breaker panel box that is flush mounted into a wall, the section of the wall along the circuit breaker panel box may get chipped or broken. The disclosed breaker panel cover extension can hide such damages in the wall around the circuit breaker panel box. The cover extension can have an aesthetic appearance that can blend-in with the existing cover of the breaker panel or the surrounding wall.

Figure 1:
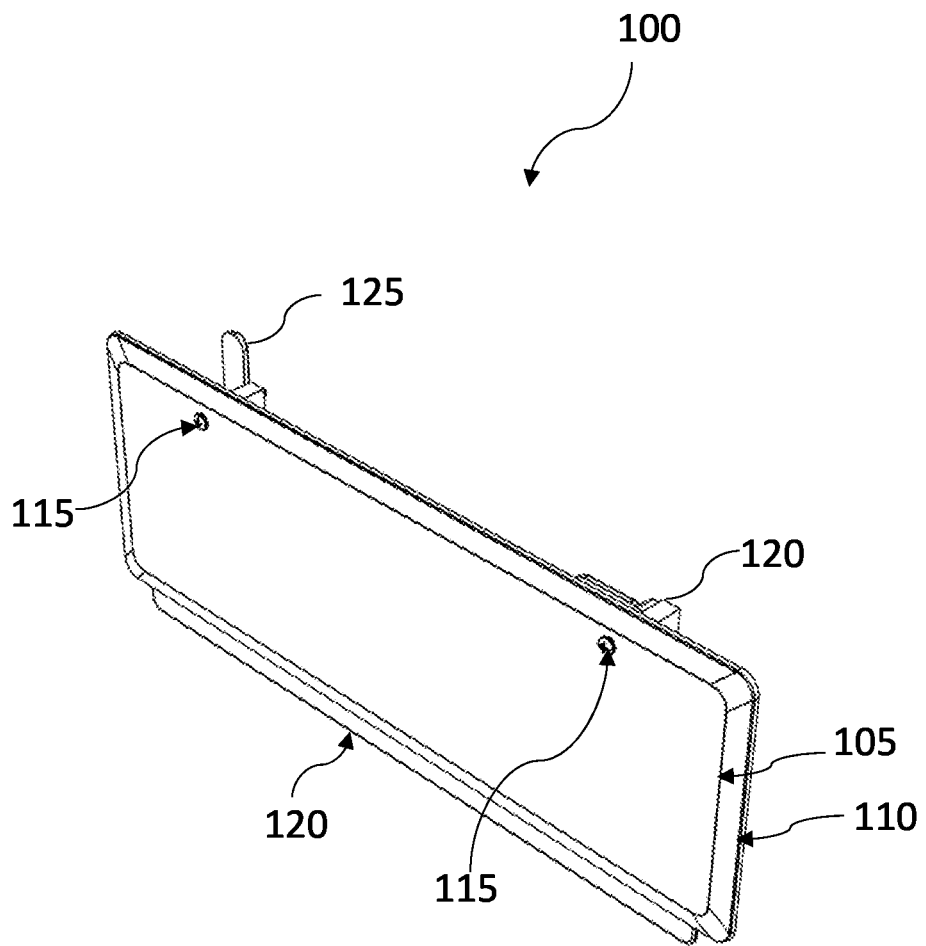
FIG. 1 is a perspective view of a breaker panel cover extension, according to an exemplary embodiment of the present invention.

Referring to FIG. 1, which shows an exemplary embodiment of the cover extension 100. The cover extension includes a panel member 105 that can be of planar geometry. The panel member can also have a slightly curved geometry. The length of the panel member can be proportional to the width of a panel cover of a breaker panel. The panel member can be made from a sheet of a rigid material, such as plastics or metal. For example, the panel member can be molded from plastic material or metal sheets. The front face of the panel member can be provided with an aesthetic appearance, such as a color shade or pattern. For example, the color shade of the panel member can match with the existing panel cover of the breaker panel. FIG. 1 also shows a curved flange 110 that extends rearwardly from the periphery of the panel member 105. Such a curved flange can be optional, but if present can have a front face continuous with the front face of the panel member 105. The curved flange can be coupled to the periphery of the panel member or the curved flange 110 and the panel member 105 can be integral. The curvature of the flange 110 can be a quarter circle. Two screw heads 115 can also be seen on the front face of panel member 105.

Figure 2:
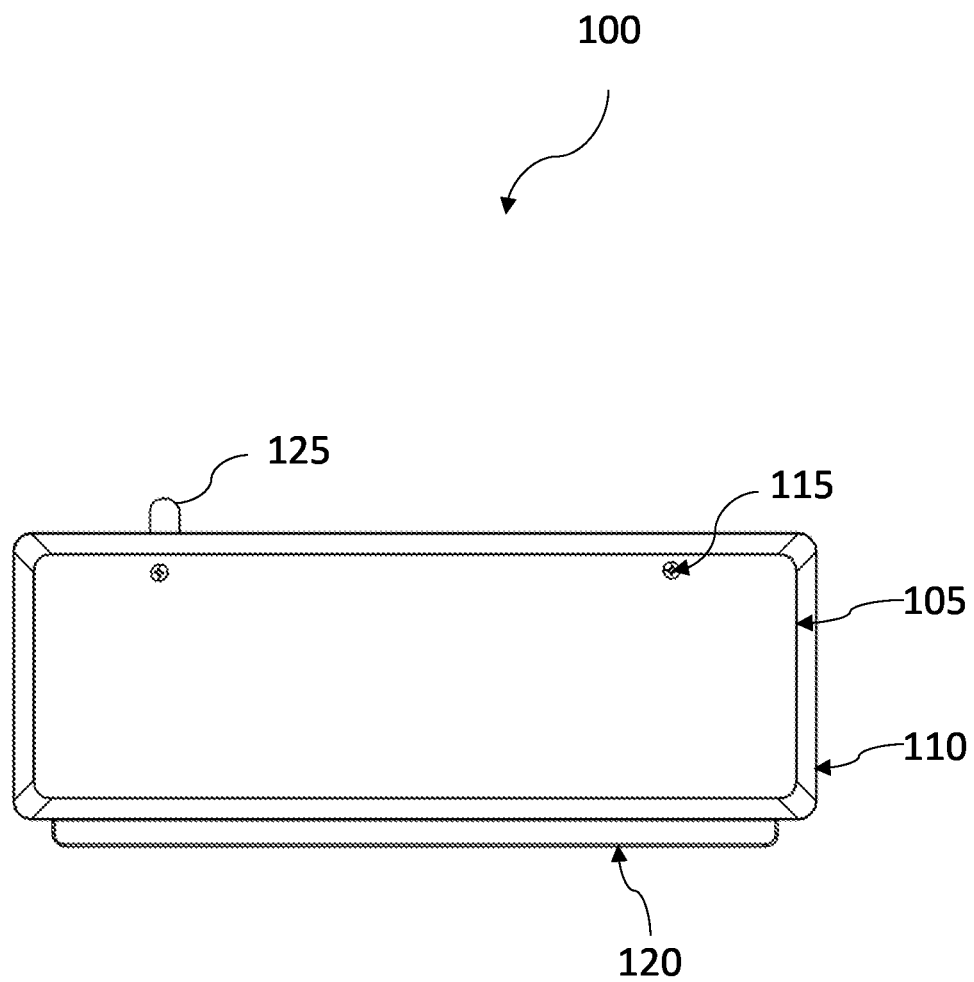
FIG. 2 shows a front face of the cover extension, according to an exemplary embodiment of the present invention.
Figure 3:
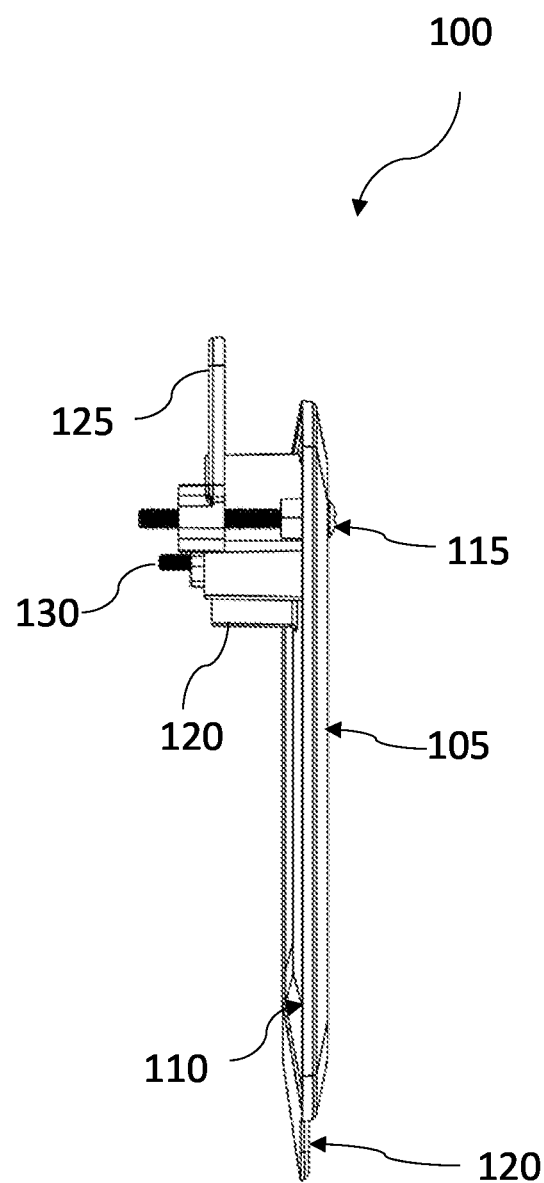
FIG. 3 is a side view of the cover extension, according to an exemplary embodiment of the present invention.

The panel member can have a top edge, a bottom edge, a left edge, and a right edge defining an area of the panel member. The panel member having a front face shown in FIG. 2 and a rear face shown in FIG. 5. The two screw heads 115 are near the top edge of the panel member 105. At the bottom edge of the panel member 105 can be seen a thin and narrow bottom flange 120 that extends downwards from the bottom edge and away from panel member 105. The thin and narrow bottom flange 120 can extend along the length of the bottom edge. The thickness of the bottom flange can be more clearly seen in FIG. 3, which shows the side view of the cover extension 100. The bottom flange 120 and the panel member 105 can be integral. While installing the disclosed cover extension 100 over drywall and above or below a breaker panel, the bottom flange 120 can be sandwiched between a panel cover of the breaker panel and the surface of the drywall for supporting the cover extension 100 over the drywall. FIG. 3 shows the bottom flange 120 continuous with the brim of the curved flange 110. The curved flange 110 and the bottom flange 120 can be integral. As described above, the curved flange 110 can be optional and in absence of the curved flange 110, the bottom flange 120 can be continuous with the rear face of the panel member but thinner than the panel member. Alternatively, the bottom flange can be slightly offset rearwardly. The length of the bottom flange can be the same or lesser than the width of the panel cover of the breaker panel.

Figure 4:
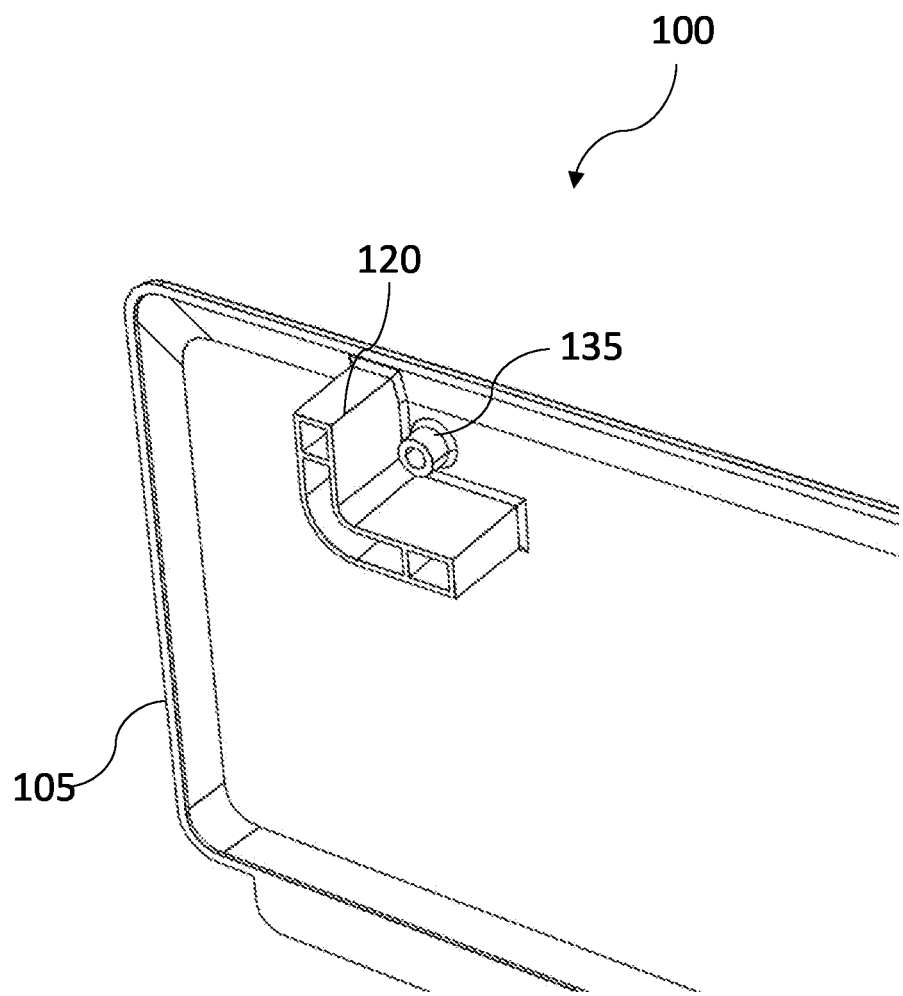
FIG. 4 is showing an integrated bracket on a rear face of a panel member of the cover extension, according to an exemplary embodiment of the present invention.
Figure 5:
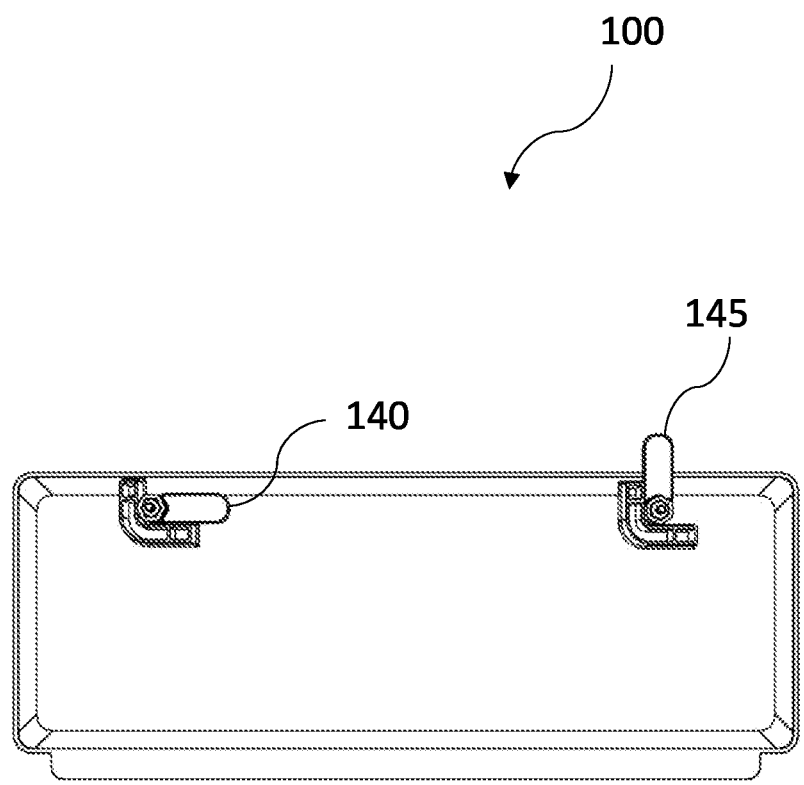
FIG. 5 shows a rear face of the cover extension, according to an exemplary embodiment of the present invention.
Figure 6:
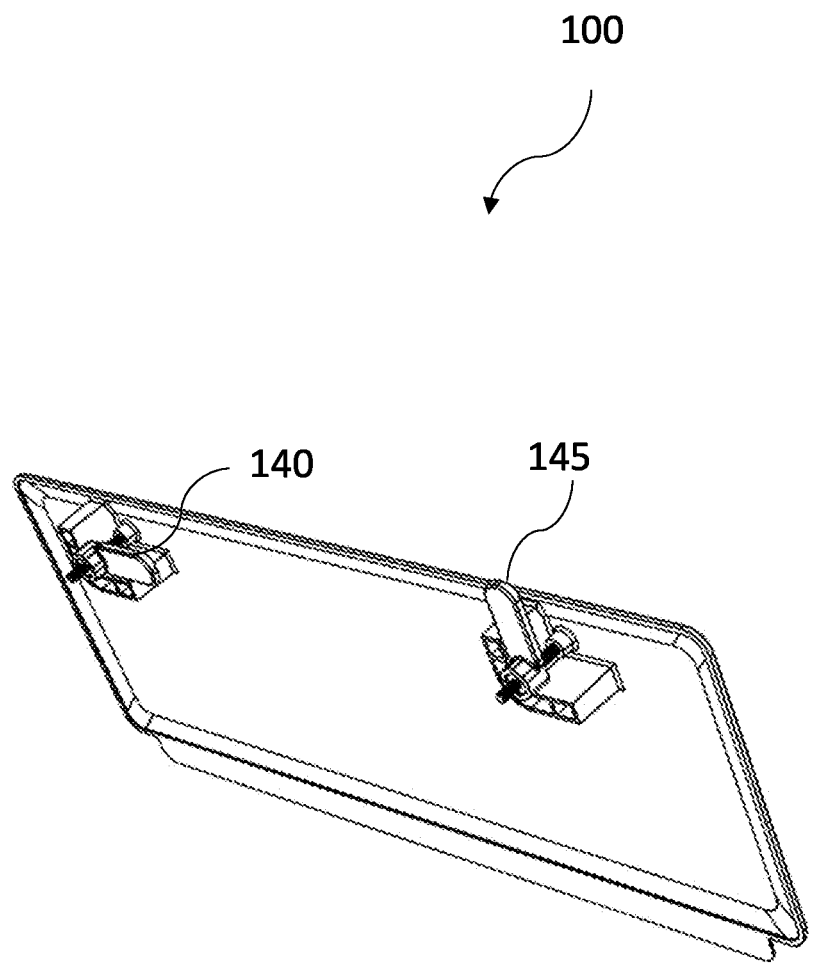
FIG. 6 is showing the brackets and flip tabs fastened using a threaded fastener, according to an exemplary embodiment of the present invention.
Figure 7:
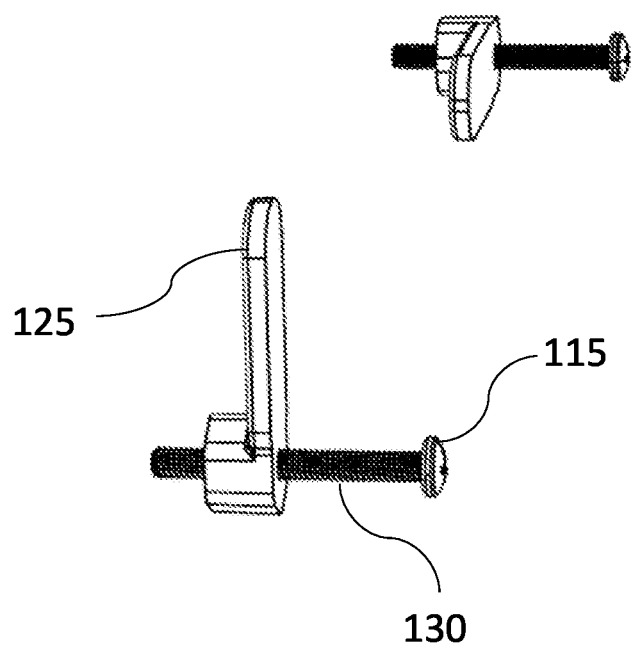
FIG. 7 shows the flip tabs with the threaded fastener, according to an exemplary embodiment of the present invention.

Referring to FIG. 4 which shows a close-up view of a bracket 120 coupled on a rear face of the panel member 105. Bracket 120 can be of an L-shaped profile having two legs, an upper leg and a side leg. The upper leg points towards the top edge of the panel member while the side leg points towards the right edge of the panel member. The two legs of bracket 120 shown in FIG. 4 is curved and continues, but a sharp intersection of the two legs can also be possible, without departing from the scope of the present invention. The bracket 120 can be protruding perpendicularly from the rear face of the panel member. The bracket 120 can be coupled to a surface of the panel member 105 or the bracket and the panel member can be integral. Two or more of such brackets can be provided on the rear face and near the top edge of the panel member 105. FIGS. 5 and 6 show two spaced brackets below the top edge of the panel member on its rear surface. Referring to FIG. 4, between the two legs of bracket 120 and adjacent the intersection of the two legs can be a hole in the panel member. A threaded fastener can freely pass through this hole. FIG. 1 shows the head 115 of the fastener retained on the front face of the panel member 105. FIG. 3 shows a threaded shank 130 of the fastener. Also, as can be seen in FIG. 4 is an annular elevated sleeve 135. Such a sleeve 135 can be used to increase the distance between the surface of the panel member and the flip tab 125. In case, the panel member is having the curved flange 110, the sleeve 135 may be needed, wherein the height of the sleeve 135 can be proportional to the height of the curved flange 110.

Referring to FIG. 6 which shows two spaced coupling members on the rear face of the panel member 105. The coupling member can be a flip tab of an elongated, thin, and narrow profile. The flip tabs can be turned 90 degrees between an engaged position and a disengaged position. The flip tabs can be turned upwards to engage with drywall for securing the cover extension 100 to the drywall. FIG. 5 shows the flip tab 140 extended sidewards against the side leg of the bracket in a disengaged position. The flip tab 145, in the same FIG. 5, is shown extended upwards against, the upwards leg of the bracket, in an engaged position. It is to be understood that drawings show the two flip tabs in upward and sideward position for illustration only, but to mount the cover extension, both the flip tabs can be switched to the engaged portion. Also, the cover extension can have one or more of such brackets and the flip tabs, without departing from the scope of the present invention.

Referring to FIG. 6 which shows the flip tabs 125 with the fasteners. One end of the flip tab 125 can be of a screw profile having inner threads. The inner threads of the flip tab 125 can threadedly engage with the threads of the fastener. Clockwise rotation of the fastener brings the flip tab closer towards the surface of the planer member i.e., the flip tab is moved towards the head of the fastener. Opposite, the anticlockwise rotation of the fastener moves the flip tab away from the planer member 105. When the flip tabs can freely rotate, the torque from the rotation of the fastener causes the rotation of the flip tabs. In case, the flip tabs are free to rotate 360 degrees, the fastener can rotate freely with the flip tabs. The brackets are positioned to limit the rotation of flip tabs up to 90 degrees i.e., between the upper leg and side leg of the bracket. When the flip-tab is in a sideward position (140 in FIG. 5), the clockwise rotation of the fastener causes the flip tab to move upwards (145 in FIG. 5) against the upper leg of the bracket. Once, the rotation of the flip-tab is restricted by the upper leg, the further clockwise rotation of the head 115 of the fastener results in vertical movement of the flip tab towards the panel member. While installing, such a movement of the flip-tab clamps the flip tab to drywall for securing the cover extension over the drywall. Rotating the fastener anti-clockwise loosens the flip tabs which then rotates laterally, and the cover extension can then be removed from the drywall.

In practice, a user wishing to add a new wire to the breaker panel first removes the panel cover. Thereafter, a section of the drywall above or below the breaker panel can be cut-off to gain access to the wires behind the drywall. Once the job is completed, the size of the section cut out from the drywall can be leveled to match the size of the cover extension, such as the brackets on the rear face just slide-in along the edge of the drywall. Thereafter, the cover extension can be positioned above or below the breaker panel, and the panel cover is attached such as the bottom flange of the cover extension is sandwiched between the panel cover and the drywall. Thereafter, the screw head on the front wall can be screwed in the clockwise direction for clamping the flip tabs to the drywall.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A circuit breaker panel cover extension for covering a section of a wall immediately above or below a circuit breaker panel, the circuit breaker panel cover extension comprising:
    a panel member having a top edge, a bottom edge, a left edge, and a right edge defining an area of the panel member, the panel member having a front face and a rear face;
    a bottom flange that extends downwards and away from the bottom edge of the panel member;
    a plurality of spaced brackets coupled on the rear face and near the top edge of the panel member, each of the plurality of brackets is of an L-shape having an upper leg and a side leg, the upper leg points towards the top edge and is substantially parallel to the left edge, the side leg points towards the right edge;
    adjacent each bracket is a hole made in the panel member between the upper leg and the side leg, and adjacent the intersection of the two legs of the bracket; and
    a plurality of flip tabs, each flip tab of an elongated and narrow profile, the flip tab swively coupled to the panel member, wherein the rotation of the flip tab is limited between the upper leg and the side leg of the bracket.

2. The circuit breaker panel cover extension according to claim 1, wherein the flip tab is having a proximal end and a distal end, the flip tab coupled to the panel member through a threaded fastener having a head retained on the top surface of the panel member and a threaded shank freely inserted into the hole, the proximal end of the flip tab is configured as a screw having inner threads configured to threadedly engage with the threads of the shank, the flip tab is of a length such as the proximal end extends upwards and away from the top edge of the panel member.

3. The circuit breaker panel cover extension according to claim 2, wherein clockwise rotation of the fastener results in vertical movement of the flip tab closer to the panel member, and anticlockwise rotation of the fastener results in the flip tab moving away from the panel member.

4. The circuit breaker panel cover extension according to claim 3, wherein the flip tab can be switched between an upward engaged position by the clockwise rotation of the fastener and a sideward disengaged position by the anti-clockwise rotation of the fastener.

5. The circuit breaker panel cover extension according to claim 1, wherein a rear face of the bottom flange is continuous with the rear face of the panel member.

6. The circuit breaker panel cover extension according to claim 1, wherein the bottom flange is slightly offset rearwardly.

7. The circuit breaker panel cover extension according to claim 1, wherein two spaced brackets are integral to the panel member and two flip tabs are swively coupled to the panel member through two fasteners, heads of the two fasteners retained on the top face of the panel member, wherein the two heads are configured to be rotated clockwise or anticlockwise.

8. A circuit breaker panel cover extension for covering a section of a wall immediately above or below a circuit breaker panel, the circuit breaker panel cover extension comprising:
 a panel member having a top edge, a bottom edge, a left edge, and a right edge defining an area of the panel member, the panel member having a front face and a rear face;
 a curved flange that extends rearwards from a periphery of the panel member, the curved edge having a quarter circle curvature, the curved flange having a top edge, a bottom edge, a left edge, and a right edge defining an area of the cover extension;
 a bottom flange that extends downwards and away from the bottom edge of the curved flange;
 a plurality of spaced brackets coupled on the rear face and near the top edge of the panel member, each of the plurality of brackets is of an L-shape profile having an upper leg and a side leg, the upper leg points towards the top edge of the curved flange and is substantially parallel to the left edge of the curved flange, the side leg points towards the right edge of the curved flange;
 adjacent each bracket is a hole made in the panel member between the upper leg and side leg, and adjacent the intersection of the two legs of the bracket;
 an elevated sleeve configured around each hole; and
 a plurality of flip tabs, each flip tab of an elongated and narrow profile, the flip tab swively coupled to the panel member at the hole and the elevated sleeve through a threaded fastener, wherein the rotation of the flip tab is limited between the upper leg and the side leg of the bracket.

9. The circuit breaker panel cover extension according to claim 8, wherein the flip tab is having a proximal end and a distal end, the threaded fastener having a head retained on the top surface of the panel member, and a threaded shank freely inserted into the hole and the elevated sleeve, the proximal end of the flip tab configured as a screw having inner threads configured to threadedly engage with the threads of the shank, the flip tab is of a length such as the proximal end extends upwards and away from the top edge of the curved flange.

10. The circuit breaker panel cover extension according to claim 9, wherein clockwise rotation of the threaded fastener results in vertical movement of the flip tab closer to the panel member, and anticlockwise rotation of the threaded fastener results in the flip tab moving away from the panel member.

11. The circuit breaker panel cover extension according to claim 10, wherein the flip tab can be switched between an upward engaged position by the clockwise rotation of the fastener and a sideward disengaged position by the anticlockwise rotation of the fastener.

12. The circuit breaker panel cover extension according to claim 8, wherein a surface of a brim of the curved flange is continuous with a rear face of the bottom flange.

13. The circuit breaker panel cover extension according to claim 8, wherein the bottom flange is slightly offset rearwardly respective to the curved flange.

14. A method for covering a section of a wall immediately above or below a circuit breaker panel, the method comprising the step of:
 providing a circuit breaker panel cover extension comprising:
  a panel member having a top edge, a bottom edge, a left edge, and a right edge defining an area of the panel member, the panel member having a front face and a rear face,
  a bottom flange that extends downwards and away from the bottom edge of the panel member,
  a plurality of spaced brackets coupled on the rear face and near the top edge of the panel member, each of the plurality of brackets is of an L-shape profile having an upper leg and a side leg, the upper leg points towards the top edge and is substantially parallel to the left edge, the side leg points towards the right edge,
  adjacent each bracket is a hole made in the panel member between the two legs and adjacent to the intersection of the two legs of the bracket, and
  a plurality of flip tabs, each flip tab of an elongated and narrow profile, the flip tab swively coupled to the panel member through a fastener, the fastener having a head retained on the top face of the panel member and a threaded shank that is inserted into the hole and threadedly engaged with the flip tab on the rear face of the panel member, wherein the fastener can be rotated clockwise and anticlockwise resulting in the rotation of the flip tab, wherein the rotation of the flip tab is limited between the upper leg and the side leg of the bracket;
 positioning the cover extension over a section of drywall above or below the circuit breaker panel;
 installing a panel cover of the circuit breaker panel, such as the bottom flange of the cover extension is sandwiched between the panel cover and the drywall; and
 turning each flip tab upwards by rotation of the head of the fastener for clamping the flip tab to the drywall.

15. A method according to claim 14, wherein the method further comprises the step of;
 adjusting the size of a cut-off section in the drywall, such as each bracket is in close proximity to an edge of the drywall when the cover extension is placed over the section of the drywall and the bottom flange is retained between the panel cover and the drywall.

16. The method according to claim 14, wherein the flip tab is having a proximal end and a distal end, the threaded shank is freely inserted through the hole, the proximal end of the flip tab is configured as a screw having inner threads configured to threadedly engage with the threads of the shank, the flip tab is of a length such as the proximal end of the flip tab extends upwards and away from the top edge of the panel member.

17. The method according to claim 16, wherein clockwise rotation of the fastener results in vertical movement of the flip tab closer to the panel member, and anticlockwise rotation of the fastener results in the flip tab moving away from the panel member.

18. The method according to claim 17, wherein the flip tab can be switched between an upward engaged position by the clockwise rotation of the fastener and a sideward disengaged position by the anticlockwise rotation of the fastener, wherein the step of turning each flip tab upwards comprises clockwise rotation of the head for clamping each flip tab to the drywall.

* * * * *